United States Patent
Mønster et al.

(10) Patent No.: US 11,539,297 B2
(45) Date of Patent: Dec. 27, 2022

(54) DC-DC POWER CONVERTER WITH IMPROVED OUTPUT CURRENT RESOLUTION

(71) Applicant: NPC Tech ApS, Herlev (DK)

(72) Inventors: Jakob Døllner Mønster, Copenhagen (DK); Thomas Andersen, Valby (DK); Mickey P. Madsen, Herlev (DK); Riccardo Pittini, Valby (DK); Martin Schøler Rødgaard, Lyngby (DK); Toke Meyer Andersen, Copenhagen (DK)

(73) Assignee: NPC Tech ApS, Herlev (DK)

( * ) Notice: Subject to any disclaimer, the term of this patent is extended or adjusted under 35 U.S.C. 154(b) by 0 days.

(21) Appl. No.: 16/631,815

(22) PCT Filed: Jul. 10, 2018

(86) PCT No.: PCT/EP2018/068618
§ 371 (c)(1),
(2) Date: Jan. 16, 2020

(87) PCT Pub. No.: WO2019/016026
PCT Pub. Date: Jan. 24, 2019

(65) Prior Publication Data
US 2020/0153345 A1    May 14, 2020

(30) Foreign Application Priority Data
Jul. 17, 2017  (EP) .................................... 17181694

(51) Int. Cl.
*H02M 3/335*    (2006.01)
*H02M 1/00*    (2006.01)

(52) U.S. Cl.
CPC ..... *H02M 3/33553* (2013.01); *H02M 1/0093* (2021.05); *H02M 3/33515* (2013.01)

(58) Field of Classification Search
CPC ....... H02M 2001/0093; H02M 3/1566; H02M 3/01; H02M 1/16; H02M 7/4815
See application file for complete search history.

(56) References Cited

U.S. PATENT DOCUMENTS

| | | | |
|---|---|---|---|
| 6,538,906 B1 * | 3/2003 | Ke .................... | H02M 3/33569 |
| | | | 323/288 |
| 10,199,950 B1 * | 2/2019 | Vinciarelli ............ | H02M 3/158 |

(Continued)

FOREIGN PATENT DOCUMENTS

| | | |
|---|---|---|
| EP | 3101797 | 12/2016 |
| WO | WO 2015/110427 | 7/2015 |

*Primary Examiner* — Gustavo A Rosario-Benitez
(74) *Attorney, Agent, or Firm* — Knobbe Martens Olson & Bear, LLP (57) ABSTRACT

The present invention relates to a DC-DC power converter which comprises a switched converter core operated in accordance with a primary control signal to supply a primary DC output current (Io) of the converter; said primary control signal exhibiting a minimum resolution, e.g. a minimum time step, leading to a corresponding minimum current step of the primary DC output current. The DC-DC power converter additionally comprises a controllable resistive path, or a controllable current source, connected between a pair of terminals selected from a group of: (the positive output terminal, the negative output terminal, the positive input terminal, the negative input terminal) and configured to add or subtract a secondary DC output current (Icon) to the primary DC output current (Io) in accordance with a secondary control signal to adjust the load current.

19 Claims, 7 Drawing Sheets

(56) References Cited

U.S. PATENT DOCUMENTS

| | | | |
|---|---|---|---|
| 10,756,632 B2* | 8/2020 | Mauri | H02M 3/335 |
| 2009/0134625 A1* | 5/2009 | Altenschulte | H02J 3/381 |
| | | | 290/55 |
| 2009/0174262 A1* | 7/2009 | Martin | H02M 3/157 |
| | | | 307/82 |
| 2011/0309759 A1 | 12/2011 | Shteynberg | |
| 2012/0123625 A1* | 5/2012 | Ueo | B60L 50/16 |
| | | | 701/22 |
| 2012/0176057 A1* | 7/2012 | Koutensky | H05B 45/385 |
| | | | 315/210 |
| 2012/0306263 A1* | 12/2012 | Tashiro | B60L 58/20 |
| | | | 307/9.1 |
| 2013/0241289 A1* | 9/2013 | Ogawa | H02M 3/158 |
| | | | 307/52 |
| 2014/0203721 A1* | 7/2014 | Qiao | H05B 47/25 |
| | | | 315/201 |
| 2015/0303806 A1* | 10/2015 | Madsen | H02M 1/08 |
| | | | 323/271 |
| 2017/0207723 A1* | 7/2017 | Zhang | H02M 1/12 |
| 2017/0302172 A1* | 10/2017 | Peretz | H02M 3/1588 |
| 2017/0373606 A1* | 12/2017 | Lin | H02M 3/24 |
| 2018/0034361 A1* | 2/2018 | Shizu | F24F 11/89 |

* cited by examiner

DC-DC POWER CONVERTER WITH IMPROVED OUTPUT CURRENT RESOLUTION

CROSS REFERENCE TO RELATED APPLICATIONS

This application is a U.S. National Phase Application of PCT International Application Number PCT/EP2018/068618, filed Jul. 10, 2018, designating the designating the United States of America and published in the English language, which is an International Application of and claims the benefit of priority to European Patent Application No. 17181694.5, filed Jul. 17, 2017. The disclosures of the above-referenced applications are hereby expressly incorporated by reference in their entireties.

The present invention relates to a DC-DC power converter which comprises a switched converter core operated in accordance with a primary control signal to supply a primary DC output current (Io) of the converter; said primary control signal exhibiting a minimum resolution, e.g. a minimum time step, leading to a corresponding minimum current step of the primary DC output current. The DC-DC power converter additionally comprises a controllable resistive path, or a controllable current source, connected between a pair of terminals selected from a group of: (the positive output terminal, the negative output terminal, the positive input terminal, the negative input terminal) and configured to add or subtract a secondary DC output current (Icon) to the primary DC output current (Io) in accordance with a secondary control signal to adjust the load current.

BACKGROUND OF THE INVENTION

Power density and conversion efficiency are typically key performance metrics of a power converter such as AC-DC, DC-AC and DC-DC power converter assemblies where it is desirable to achieve small physical size and high efficiency for a given output power specification. Resonant power converters are well-known types of DC-DC switched mode power supplies or converters (SMPS). Resonant power converters are particularly useful for high switching frequencies such as above 1 MHz where switching losses of standard SMPS topologies (Buck, Boost etc.) tend to be unacceptable for conversion efficiency reasons. Resonant power converters include a semiconductor switch arrangement, often including one or several MOSFET(s), GaN(s), SiCor or IGBT switches, relying on the resonances of circuit capacitances and inductances to shape the waveform of either the current or the voltage across the switching element (s) such that, when switching takes place, there is no current through and/or voltage across the switching element(s). Hence switching loss is largely eliminated in at least some of the intrinsic capacitances of the input switching element such that a dramatic increase of the switching frequency becomes feasible for example to values at and above 3 MHz, 5 MHz or 10 MHz. This feature is known in the art under designations like zero voltage and/or current switching (ZVS and/or ZCS) operation. Commonly used switched mode power converters operating under ZVS and/or ZCS are often designated class E, class F or class DE inverters or power converters.

Existing DC-DC power converters are often unable to supply a sufficiently accurate current to a load at small output current levels due to a lack of adequate resolution of the output current of the converter. Output current resolution limits are often imposed by a minimum time resolution of control pulses of a modulated switch control signal operating a switched converter core. The modulated switch control signal may comprise duty-cycle or ON-OFF modulation or PWM (pulse width modulation) that are commonly applied for DC output voltage control or DC output current control in DC-DC power converter designs. Even though improved time resolution of the control pulses, and hence better DC output current resolution, may be achieved by using high-end control circuits, such as a microprocessor, FPGA, this will add undesirable complexity and costs to the DC-DC power converter.

The present invention addresses and solves inter alia problems associated with the inadequate output current resolution of existing DC-DC power converters.

SUMMARY OF THE INVENTION

A first aspect of the invention relates to a DC-DC power converter comprising:

a primary side circuit comprising a positive input terminal and a negative input terminal for receipt of a DC input voltage, a secondary side circuit comprising a positive output terminal and a negative output terminal for supply of a load current to a load. The DC-DC power converter further comprising:

a switched converter core operated in accordance with a primary control signal to supply a primary DC output current (Io) of the converter; said primary control signal exhibiting a minimum resolution, e.g. a minimum time step, leading to a corresponding minimum current step of the primary DC output current, a controllable resistive path, or a controllable current source, connected between a pair of terminals selected from a group of: (the positive output terminal, the negative output terminal, the positive input terminal, the negative input terminal) and configured to add, i.e. source, or subtract, i.e. sink a secondary DC output current (Icon) to the primary DC output current (Io) in accordance with a secondary control signal to adjust the load current (Iload).

The switched converter core may comprise controllable switch arrangement which may comprise one, two or even more interconnected semiconductor switches controlled by the primary control signal. The primary control signal may comprise a modulated switch control signal such as a PWM modulated switch control signal or voltage, a PDM modulated switch control voltage, a PAM modulated switch control voltage, a duty-cycle/burst-mode modulated switch control voltage. Each of the semiconductor switches of the controllable switch arrangement may comprise a transistor such as a bipolar junction transistor or a MOSFET. The MOSFET may comprise a NMOS transistor, or a Gallium Nitride (GaN) MOSFET or Silicon Carbide (SiC) MOSFET or IGBT. The control terminal, e.g. a gate or base, of each of the one, two or more semiconductor switches may be coupled to, and driven by, the primary control signal or control signal derived therefrom to alternatingly force the semiconductor switch in question between on-states and off-states. An output of the controllable switch arrangement may be connected to a resonant network and excite the resonant network at, or around, a fundamental resonance frequency of the network. The skilled person will understand that the secondary side circuit may comprise a rectification circuit which is configured to convert an AC output voltage or current of the controllable switch arrangement, or of the resonant network, into a corresponding DC output voltage or current.

In one embodiment the controllable resistive path, or the controllable current source, is connected between the positive output terminal and negative output terminal. In another embodiment, the controllable resistive path, or the controllable current source, is connected between the positive output terminal and positive input terminal. According to yet another embodiment, the controllable resistive path, or the controllable current source, is connected between the negative output terminal and negative input terminal. Alternatively, the controllable resistive path, or the controllable current source, may be connected between the positive input terminal and negative input terminal. The secondary control signal may be configured to adjust a resistance of the controllable resistive path to control the secondary DC output current. The secondary control signal may alternatively be configured adjust a current level or magnitude of the controllable current source and thereby directly adjust the secondary DC output current. The controllable current source may comprise a multibit current DAC. The level or magnitude of the secondary DC output current supplied by the controllable current source is substantially independent of the voltage across the current source in contrast to the controllable resistive path in which the respective voltages at the input and output terminals in question determine the magnitude of the secondary DC output current.

The resistance of the controllable resistive path may comprise a transistor, e.g. MOSFET operating in its linear region or operating in triode-mode such that the drain-source region provides an adjustable resistance. A control terminal of the transistor, e.g. gate or base, is preferably connected to the secondary control signal. The secondary DC output current may be adjustable between a minimum current and a maximum current by adjusting the resistance of the controllable resistive path. The secondary control signal may comprise a DC voltage or a modulated control voltage such as a PWM modulated voltage, a PDM modulated voltage, duty-cycle/burst-mode modulated voltage, i.e. on/off controlled control voltage, etc.

The modulated control voltage is preferably derived from a multibit control value or signal for controlling a modulation of the PWM modulated voltage or a modulation of the PDM modulated voltage or a modulation of the burst-mode modulated voltage. The multibit control signal may comprise a predetermined number of steps. The step size may set a minimum time resolution of the modulated control voltage and in certain embodiments also fixate a resolution of the resistance of the controllable resistive path. The resolution of the resistance of the controllable resistive path may set the minimum value of the secondary DC output current and the maximum value of the secondary DC output current.

If the controllable current source comprises the multibit current DAC, the secondary control signal may be a digital signal or digital value setting or defining the current level or magnitude sourced by the multibit current DAC or sunk by the multibit current DAC.

According to one embodiment the minimum step of the primary DC output current is substantially equal to the maximum value of the secondary DC output current. This may be achieved by appropriate design of the adjustable resistance and the secondary control signal.

If the secondary DC output current is supplied by the previously-mentioned controllable current source, the latter may be connected between the pair of terminals selected from the group of: (the positive output terminal, the negative output terminal, the positive input terminal, the negative input terminal).

The skilled person will understand that certain a converter topology selected from a group of {class E, class F, class DE, class EF, LLC, LCC, SEPIC}. The resonant power converter may comprise a galvanic isolation barrier to provide electrical insulation between primary side circuitry and secondary side circuitry of the power converter assembly. A galvanically isolated resonant power converter may comprise different types of galvanic isolation barriers for example a pair of magnetically coupled inductors that may be arranged as a transformer. The resonant power converter may comprise a so-called self-oscillating topology where a feedback loop is extending from the output of the controllable switch arrangement to a control terminal of at least one of the one or more semiconductor switches of the controllable switch arrangement. The feedback loop is configured to induce self-oscillation in the resonant DC-DC power converter for example by designing the feedback loop with appropriate loop gain and loop phase characteristics.

Additional embodiments of the invention are recited by the further dependent claims appended below.

BRIEF DESCRIPTION OF THE DRAWINGS

A preferred embodiment of the invention will be described in more detail in connection with the appended drawings, in which.

DETAILED DESCRIPTION OF PREFERRED EMBODIMENTS

In the following, various exemplary embodiments of the present DC-DC power converter assembly are described with reference to the appended drawings. The skilled person will understand that the accompanying drawings are schematic and simplified for clarity and therefore merely show details which are essential to the understanding of the invention, while other details have been left out. Like reference numerals refer to like elements or components throughout. Like elements or components will therefore not necessarily be described in detail with respect to each figure. It will further be appreciated that certain actions and/or steps may be described or depicted in a particular order of occurrence while those skilled in the art will understand that such specificity with respect to sequence is not actually required.

Figure 1:
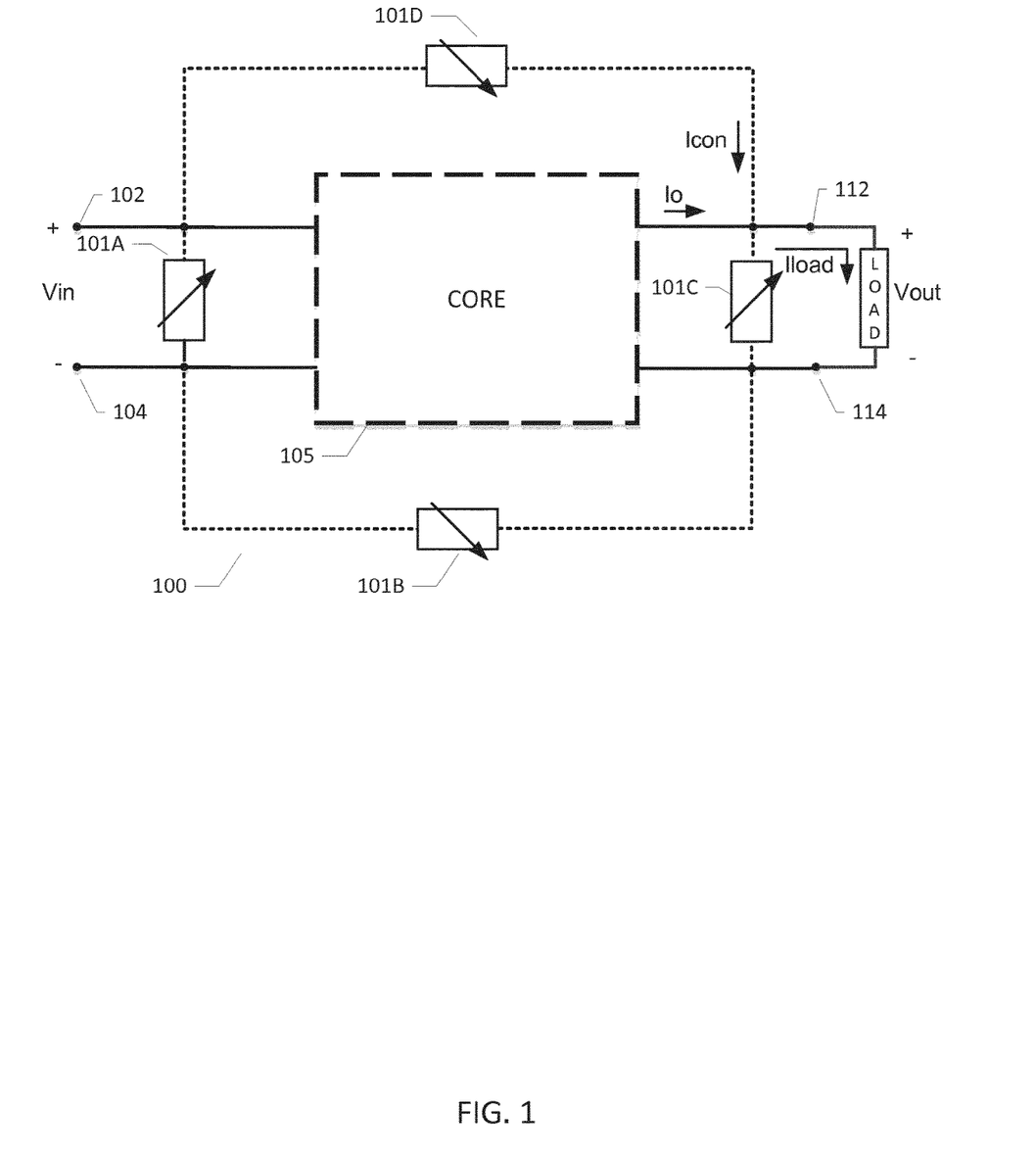
FIG. 1 is a block diagram illustrating various exemplary embodiments of the present DC-DC power converter.

FIG. 1 is a schematic diagram illustrating various exemplary embodiments of the present DC-DC power converter 100 in a single drawing. The DC-DC power converter 100 comprises a primary side circuit which comprises a positive input terminal 102 and a negative input terminal 104 for receipt of a DC input voltage Vin. A secondary side circuit comprises a positive output terminal 112 and a negative output terminal 114 for supply of a DC voltage and a load current to a load, LOAD, of the power converter. The load may generally exhibit inductive, capacitive or resistive impedance and may include a LED diode assembly as discussed below.

A switched converter core 105 is operated in accordance with a primary control signal (not shown) to supply a primary DC output current (Io) of the switched converter core 105. The level of the primary DC output current (Io) may be set or controlled by a current regulation loop (not shown) which generates the primary control signal. The switched converter core 105 of the DC-DC power converter 100 may comprise a non-resonant or a resonant converter. The resonant converter may comprise a converter topology selected from the group {class E, class F, class DE, class EF, LLC, LCC, SEPIC}. Certain embodiments of the switched converter core 105 may comprise a galvanic isolation barrier coupling the primary side circuit to the secondary side circuit e.g. as discussed below in additional detail. The primary control signal may comprise a modulated switch control signal such as a PWM modulated switch control signal or voltage, a PDM modulated switch control signal, a PAM modulated switch control signal or a duty-cycle/burst-mode modulated switch control signal. If the DC-DC power converter 100 comprises a resonant converter, the switched converter core 105 may be configured with a switching frequency above 1 MHz, or above 5 MHz, or above 10 MHz, or even at or above 20 MHz—for example in the VHF range. The switched converter core may comprise a self-oscillating class E converter or a self-oscillating class F converter, or a self-oscillating class DE converter.

Figure 5:
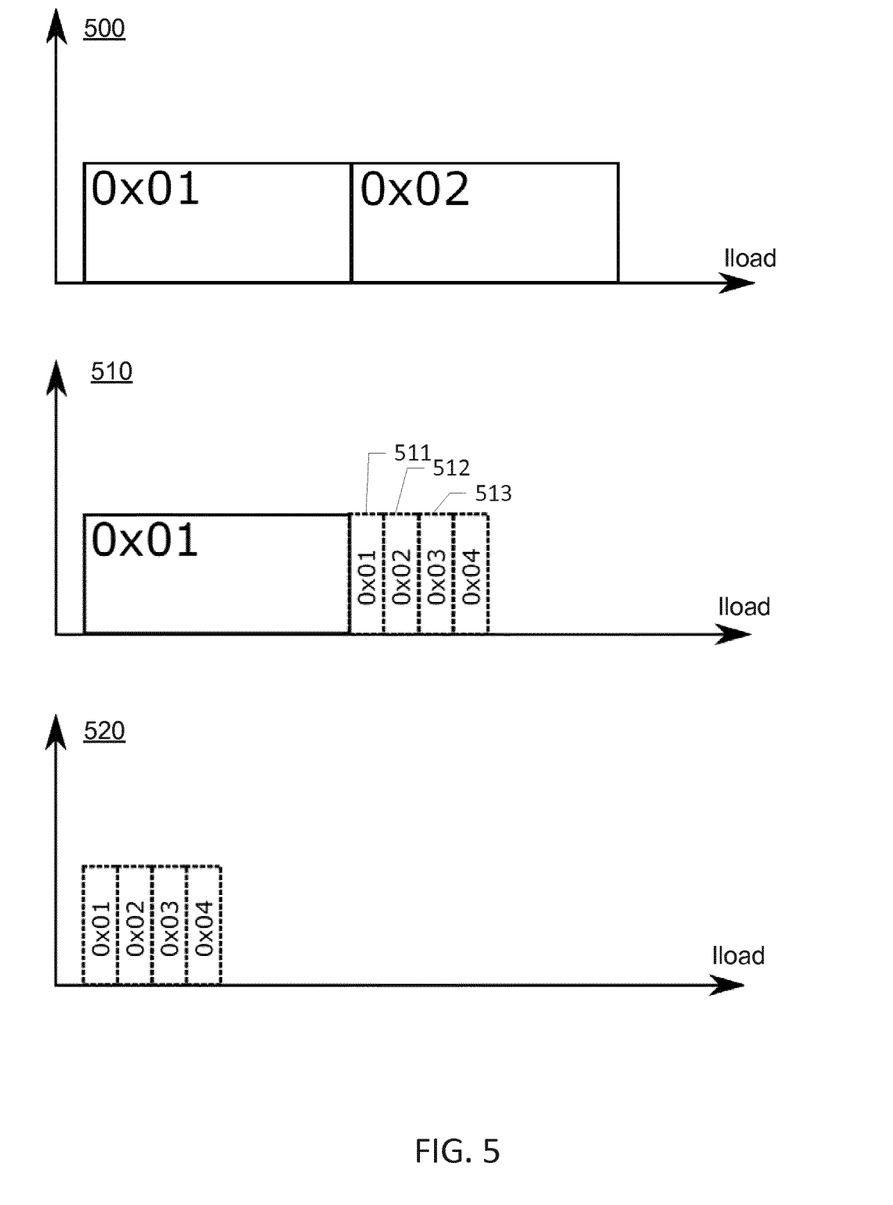
FIG. 5 illustrates the improved resolution of the load current provided by a controllable resistive path of the DC-DC power converter.

The modulated switch control signal often exhibits a minimum time step (1 LSB) leading to a corresponding minimum step of the primary DC output current (Io). This minimum time step or time resolution may for example correspond to a minimum width of pulse of a PWM modulated switch control signal. For example, a common 8-bit PWM modulated control signal for operating the switched converter core may have 256 pulse width steps of resolution corresponding to 0.39% of a maximum width of the control pulse. Hence, if the desired or target maximum output current of the switched converter core is 1 A, then the minimum step or resolution of the output current (Io) is 3.9 mA. The consequence of this minimum step or resolution of the output current is graphically illustrated by graph 500 of FIG. 5 showing the smallest and next-smallest steps of the DC output current corresponding to digital values 0×01 and 0×02 of the PWM modulated control signal. Hence, in the above case, the minimum step or resolution of the DC output current of the switched converter core is 3.9 mA. The smallest increment of the output current from this minimum value of 3.9 mA is 7.8 mA—under the assumption that only the PWM modulated control signal is available to adjust the DC output current of the power converter and hence also the load current (Iload). For all practical switch-mode DC-DC converter designs there will be a limit to the minimum PWM ON time, even with high-resolution PWM ICs, resulting in a finite or minimum resolution of the DC output current and therefore also a minimum DC output current and a minimum current step. At lower levels of the DC output current the DC-DC power converter is switched completely off. This is, however, a disadvantage if the DC-DC power converter is utilized to supply drive current to a LED based load. In the latter type of lightning applications low-level output current performance is important due to the high sensitivity of the human eye at low light levels. Smaller steps of the DC output current (i.e. higher resolution) leads to an improvement of the perceptual quality of the LED/lamp. Therefore, it is desirable to extend the control of the DC output current of the DC-DC power converter to the smallest practical level by increasing the resolution of the DC output current. This lacking resolution of the DC output current at low levels is likewise a disadvantage in numerous other applications of the DC-DC power converter.

The present invention provides improved resolution of the load current by the inclusion of at least one controllable resistive path (101A, 101B, 101C, 101D), or the inclusion of a least one controllable/programmable current source (464 on FIG. 4A), connected between at least one pair of terminals of the DC-DC power converter where the pair of terminals is selected from the group of {the positive output terminal (112), the negative output terminal (114), the positive input terminal (102), the negative input terminal (104). The at least one controllable resistive path or controllable current source is configured to add (source) a secondary DC output current (Icon) to the primary DC output current (Io) or subtract (sink) the secondary DC output current (Icon) from the primary DC output current (Io) in both instances in accordance with a secondary, and separate, control signal (not shown). The secondary control signal may be digital, comprising a predetermined number of bits, or analog. In one exemplary embodiment, the secondary DC output current (Icon) is suppled through the controllable resistive path 101D and added to the primary DC output current (Io) at the positive output terminal or node 112 such that the load current is the sum of Io and Icon. Hence, the DC input voltage source supplies the secondary DC output current (Icon).

Certain embodiments of the invention may include an additional controllable resistive path (not shown) connected in parallel with anyone of the controllable resistive paths 101A, 101B, 101C, 101D. The components and topology of the additional controllable resistive path may be identical to those of the at least one controllable resistive path 101A, 101B, 101C, 101D. A resistance of the additional controllable resistive path may be adjusted by a separate control signal to provide even higher resolution of the load current. For an example utilizing an 8 bit PWM signal as the separate control signal of the additional controllable resistive path will provide up to 256 steps of resolution of the load current. If the each of the primary control signal and the secondary control signal comprises a similar 8 bit PWM signal for control purposes, the additional controllable resistive path will enable an effective resolution of the load current of 24 bit equalling 16777216 steps.

The least one controllable resistive path (101A, 101B, 101C, 101D) may comprise a resistor with adjustable resistance controlled by the secondary control signal. The resistor may comprise a semiconductor device such as one or more transistors, e.g. MOSFET(s), GaN, IGBT, BJT, etc., operating in linear region or triode-mode. A control terminal(s) of the one or more transistors are connected to the secondary control signal. The secondary control signal may comprise a DC control voltage which adjusts the resistance of the one or more transistors. In an alternative embodiment, the secondary control signal comprises a modulated control voltage such as a PWM modulated voltage, PDM modulated voltage, duty-cycle/burst-mode modulated voltage (on/off control) that switches the semiconductor device between on-state and off-state in accordance with a switching frequency of the modulated control voltage. Using this control mechanism, the apparent resistance of the least one controllable resistive path corresponds to the average on-time and on-resistance of the semiconductor device. In some embodiments, a fixed resistance, e.g. passive resistor, may be coupled in series with the semiconductor device. The passive resistor may be dimensioned to set a maximum current through the least one controllable resistive path if the resistance of the passive resistor is significantly larger than the on-resistance of the semiconductor device, e.g. more than 10 times larger. The semiconductor switch still controls the level of the secondary DC current through the secondary control signal, e.g. by adjusting its duty cycle.

The least one controllable resistive path may in some embodiments be active simultaneously with the switched converter core 105 to provide a finer or improved resolution of the load current as graphically illustrated by graph 510 of FIG. 5. This effect may be achieved by designing the least one controllable resistive path such that the maximum secondary output current (Icon) substantially corresponds to the minimum step of the primary DC output current (Io). Depending on the resolution of the secondary DC output current (Icon), the load current may be incremented or decremented in small steps 511, 512, 513 etc., hence very accurately, relatively to the previously discussed minimum value of 0x01, e.g. 3.9 mA, or relatively to any other value of the primary DC output current (Io). The skilled person will understand that the resolution of the secondary DC output current (Icon) may be set by multibit secondary control signal which comprises a predetermined number of discrete steps such as between 4 steps (2 bits) and 16777216 steps (24 bits). E.g. between 256 steps (8 bits) and 65536 steps (16 bits) depending on characterises of the controllable resistive path and the secondary control signal.

The least one controllable resistive path, or the at least one controllable current source, may in alternative embodiments be active while the switched converter core 105 is interrupted or powered-down such that the primary DC output current (Io) is zero. In the latter embodiment, the operation of the least one controllable resistive path, or the operation of the at least one controllable current source, extends the minimum load current (Iload) below the minimum DC output current (Io) of the switched converter core. This feature provides improved resolution of the load current at small levels as graphically illustrated by graph 520 of FIG. 5. Hence, the DC-DC power converter 100 is capable of providing a smooth transition in the supply of load current from an off-state to the on-state or vice versa. The power conversion efficiency of the DC-DC power converter 100 may decrease when the least one controllable resistive path, or the at least one controllable current source, is active because a portion of some of the output current is dissipated in the resistance of the resistive path or in the current source. However, at very small DC load current levels the power conversion efficiency is of lesser importance because the DC-DC power converter 100 will rarely operate for prolonged time periods in that state and the absolute power levels are very low.

Figure 2:
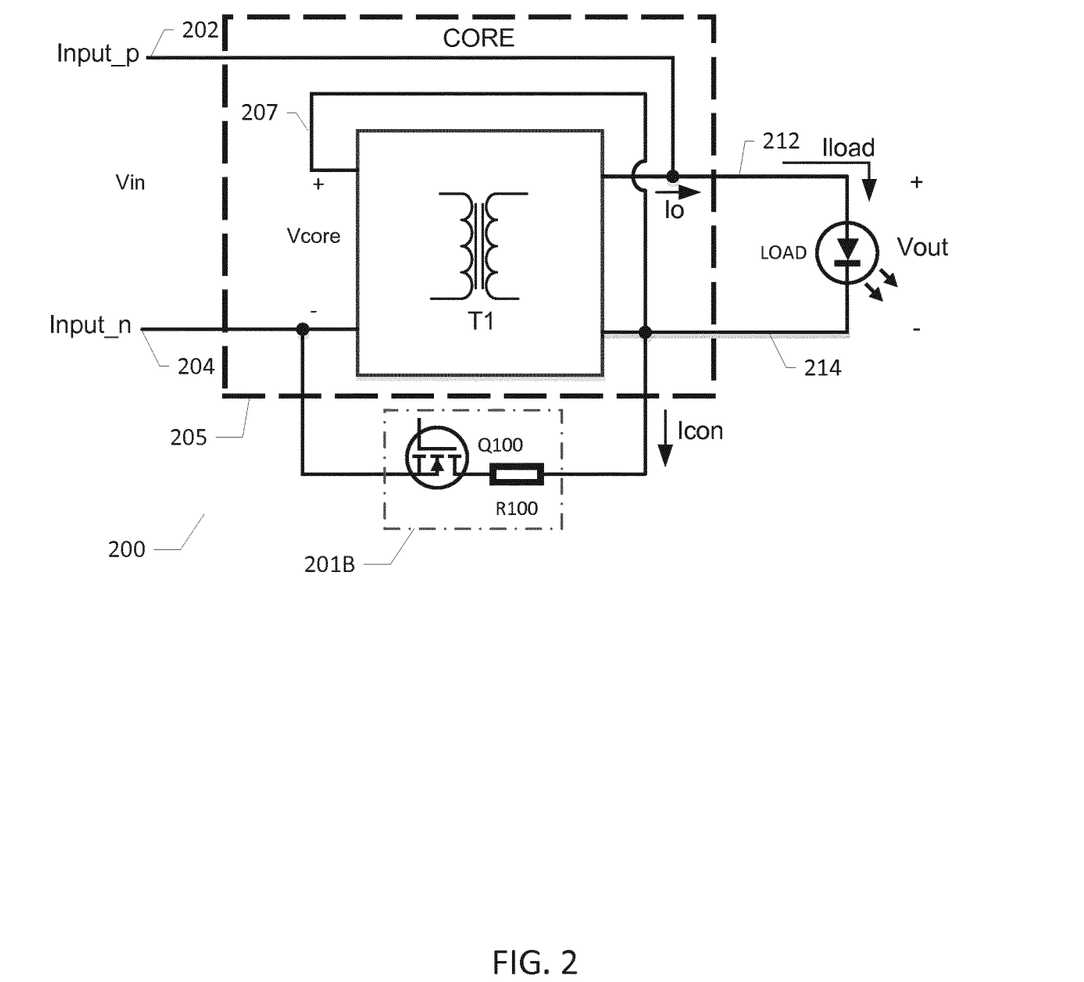
FIG. 2 is a block diagram of a DC-DC power converter in accordance with a first embodiment of the invention.

FIG. 2 is a block diagram of a DC-DC power converter 200 in accordance with a first embodiment of the invention. The switched converter core 205 of the DC-DC power converter 200 comprises a galvanic isolation barrier T1, e.g. a transformer or a capacitive barrier, coupling the primary side circuit to secondary side circuit. An electrical connection or wire 207 runs between the positive input (+) of the core 205 and the negative output terminal 214 of the converter core to arrange the input and output of the switched converter core in series across the DC input voltage Vin. The implementation and advantages of this input-output coupling arrangement is described in detail in PCT publication WO 2015/110427. The DC-DC power converter 200 additionally comprises a controllable resistive path 201B connected between the negative output terminal 214 and the negative input terminal 204. The controllable resistive path 201B add a secondary DC output current (Icon) to the primary DC output current (Io) and thereby increase the load current (iload). The secondary DC output current (Icon) is supplied by the DC input voltage source connected between the positive and negative input terminals 202, 204.

The switched converter core 205 may comprise a resonant high frequency Class-DE converter operating at a switching frequency above 1 MHz, or above 5 or above 10 MHz or even at or above 20 MHz for example in the VHF range. The switched converter core 205 may be operated in burst mode, with a PWM switch control signal that gives a proportional DC output current to the modulation of the PWM switch control signal. The controllable resistive path 201B comprises a NMOS transistor Q100 coupled in series with a resistor R100. The resistor R100 is dimensioned to limit the secondary DC output current (Icon) to at least the minimum DC output current (Io) of the switched converter core 205. In this configuration Q100 can be controlled to increases it's resistance, either linearly by the magnitude/level of the secondary control signal or by a modulation of a modulated secondary control signal such that an average load current (Iload), i.e. the current through the LED (LOAD) will be controlled accordingly, providing the improved resolution of the load current as well as the ability to lower the minimum load current as discussed above in detail.

The skilled person will appreciate that the DC-DC power converter 200 in certain embodiments by include an additional, or second, controllable resistive path (not shown) connected between the negative output terminal 214 and the negative input terminal 204. The components and topology of the second, controllable resistive path may be identical to the controllable resistive path 201B. A resistance of the second, controllable resistive path may be adjusted by another or third separate control signal to provide even higher resolution of the load current. For an example utilizing an 8 bit PWM signal as the third separate control signal will provide 256 steps of resolution of the DC current supplied by the second, controllable resistive path. If this resolution improvement is added to the corresponding resolutions of the primary control signal and secondary control signal this feature will enable an effective resolution of the load current up to 24 bits equalling 16777216 discrete steps.

Figure 3:
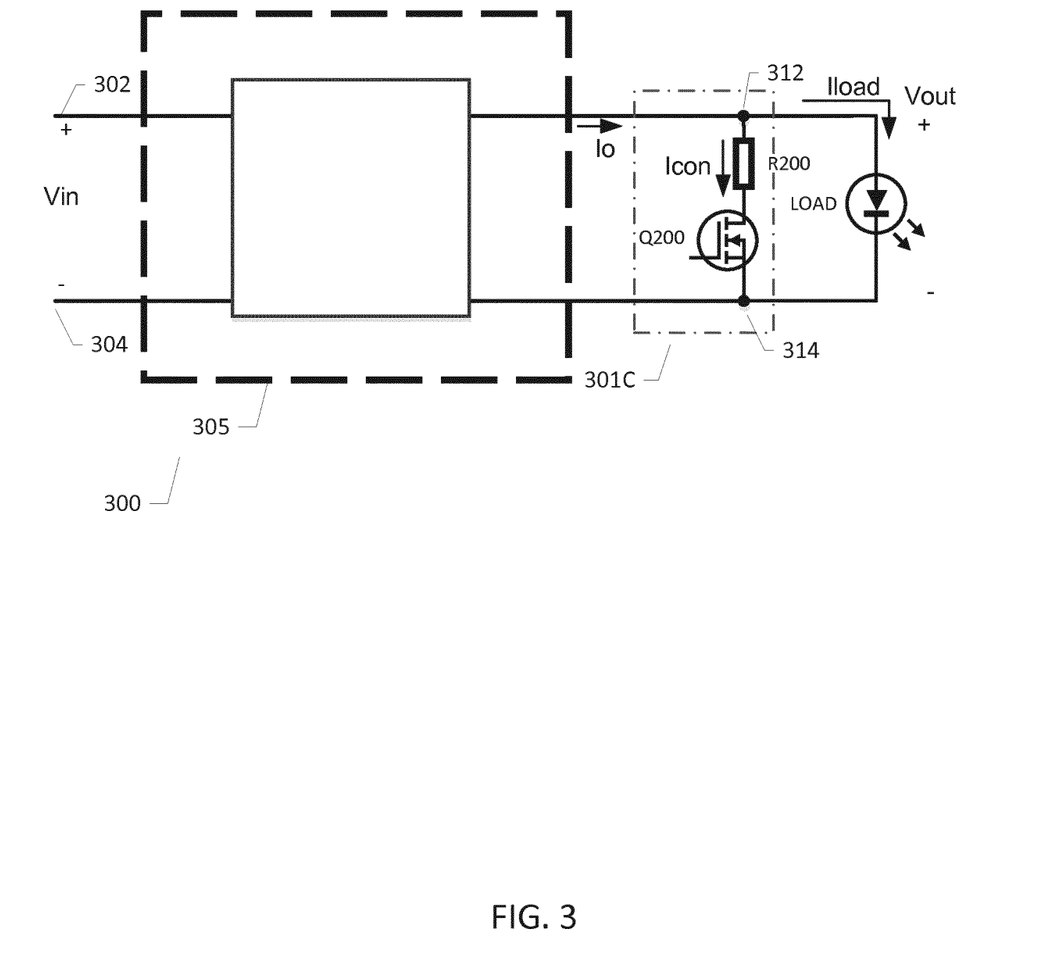
FIG. 3 is a block diagram of a DC-DC power converter in accordance with a second embodiment of the invention.

FIG. 3 is a block diagram of a DC-DC power converter 300 in accordance with a second embodiment of the invention. The switched converter core 305 of the DC-DC power converter 300 may comprise a high frequency Class-E converter, but could alternatively comprise any kind of current sourcing/outputting converter topology. The DC-DC power converter 300 additionally comprises a controllable resistive path 301C connected between the positive output terminal 312 and the negative output terminal 314. The controllable resistive path 301C is thus coupled in parallel with the converter load, LOAD e.g. one or more LEDs. The controllable resistive path 301C is configured to subtract a secondary DC output current (Icon) from the primary DC output current (Io) supplied by the output of the switched converter core 305 and thereby decrease the load current (iload) in a well-controlled manner. The adjustable resistance of the controllable resistive path 301C comprises a series coupled NMOSFET (Q200) and resistor (R200) where the secondary control signal is applied to the gate of Q200. When the switched converter core 305 delivers its minimum DC output current, as set by the primary control signal, the controllable resistive path 301C can be activated using for example a PWM signal as the secondary control signal. The adjustable resistance of the controllable resistive path 301C will sink, or subtract, a secondary DC output current (Icon) from the minimum DC output current. As the minimum DC output current is fixed for example by the time resolution of a modulated type of primary switch control signal as discussed above, the secondary DC output current (Icon) is removed from the load current (Iload) to provide the previously discussed increased load current resolution. The skilled person will appreciate that the DC-DC power converter 300 must be active to enable the functionality of the controllable resistive path 301C.

Figure 4:
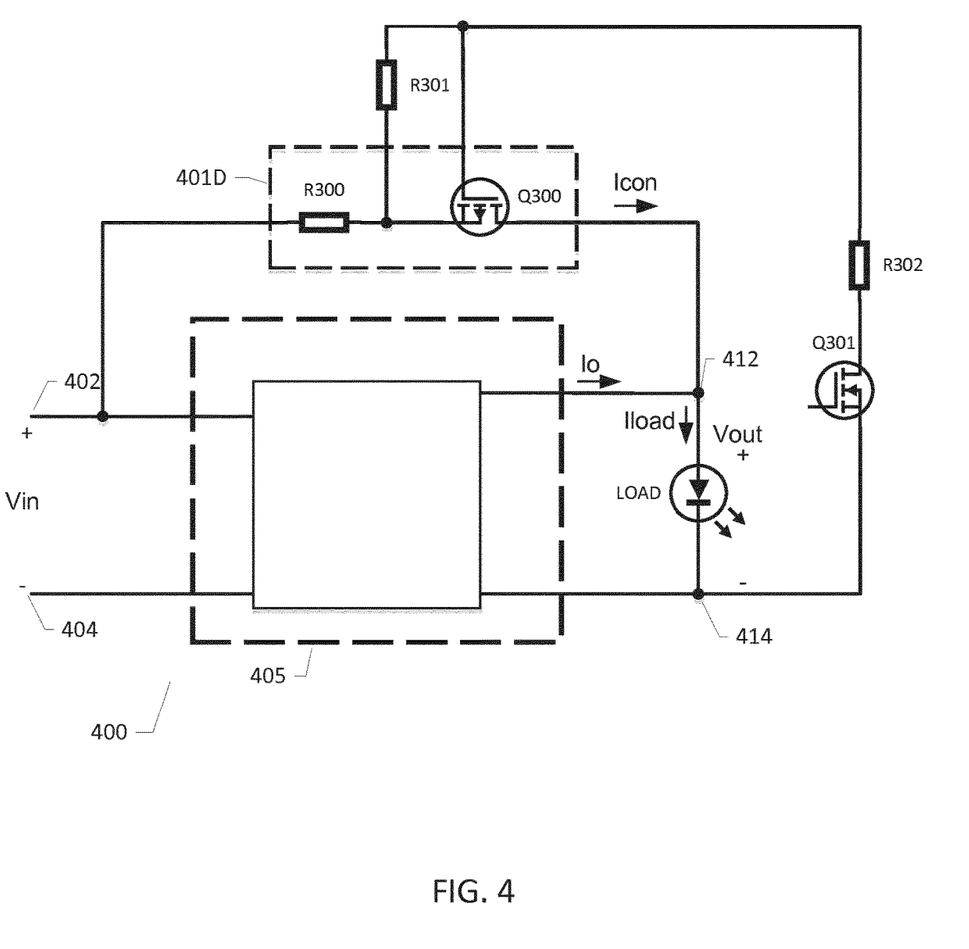
FIG. 4 shows a block diagram of a DC-DC power converter in accordance with a third embodiment of the invention.

FIG. 4 is a block diagram of a DC-DC power converter 400 in accordance with a third embodiment of the invention. The switched converter core 405 of the DC-DC power converter 400 may comprise a resonant converter such as one of a {class E, class F, class DE, class EF, LLC, LCC, SEPIC}. The DC-DC power converter 400 additionally comprises a controllable resistive path 401D connected between a positive output terminal 412 and a positive input terminal 402 of the DC power converter 400, where the DC voltage of the positive input terminal 402 is higher than the DC voltage of the positive output terminal 412. The controllable resistive path 401D comprises a series coupled PMOSFET (Q300) and resistor (R300) to provide the adjustable resistance of the resistive path 401D. The secondary control signal comprises a modulated control signal such as the previously discussed secondary PWM control signal that is applied to a gate of PMOSFET (Q300) to switch Q300 between on-states and off-states and control the resistance of the path. Q300 may be controlled with a small NMOS (Q301) and two resistors, R302, R301, jointly dimensioned to keep a gate voltage of PMOS Q300 within its design limits.

The DC-DC power converter 400 is preferably configured as a buck or step-down converter where the DC input voltage Vin at the positive and negative input terminals 402, 404 is converted into a lower DC output voltage across the positive and negative output terminals 412, 414. The secondary control signal can for example be generated by a suitable processor such as a microprocessor connected directly to NMOS Q301 as it is ground referenced. Hence, the control network comprising the small NMOS (Q301) and the resistors R302, R301 provides a simple interface between the processor and the PMOS Q300 despite the latter is floating relative to circuit ground. The secondary control signal will therefore turn-on and turn-off Q300 to add an adjustable secondary DC output current (Icon) to the DC output current (Io) of the switched core 405 to adjust the DC current to the load, LOAD. The secondary DC output current (Icon) is supplied by the DC input voltage source connected between the positive and negative input terminals 402, 404 due to the higher DC input voltage than DC output voltage. The skilled person will appreciate that the functionality of the controllable resistive path 401D is available independent of the operational state of the DC-DC power converter 400, i.e. the latter can be active or inactive e.g. powered down or interrupted.

Figure 4A:
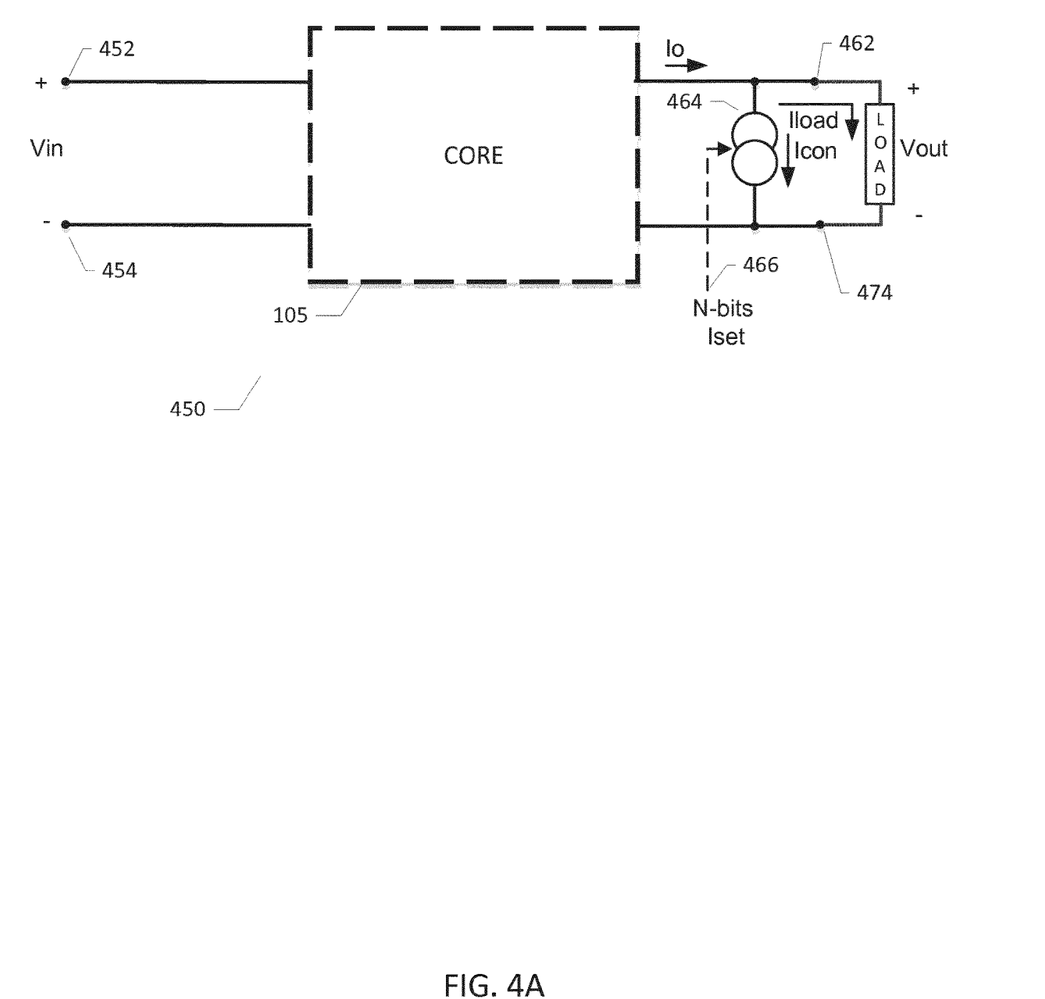
FIG. 4A is a block diagram of a DC-DC power converter in accordance with a fourth embodiment of the invention.

FIG. 4A is a block diagram of a DC-DC power converter 450 in accordance with a fourth embodiment of the invention based on one or several controllable current source(s) instead of the controllable resistive path(s) as discussed above. The switched converter core 105 of the DC-DC power converter 450 may comprise a galvanic isolation barrier, e.g. a transformer or a capacitive barrier, coupling the primary side circuit to secondary side circuit. The switched converter core 105 of the DC-DC power converter 450 may comprise a high frequency Class-E or DE converter which is switched accordance with a primary control signal (not shown) to supply a primary DC output current (Io) of the converter 105. A DC input voltage Vin is supplied at the positive and negative input terminals 452, 454 and converted into a lower DC output voltage or a higher DC output voltage across the positive and negative output terminals 462, 474.

The DC-DC power converter 450 additionally comprises a digitally controllable or programmable current source 464 in which the magnitude and polarity of the supplied secondary DC output current Icon is controlled by a digital control signal 466. The digitally controllable current source 464 preferably directly sets the level of the secondary DC output current Icon. The digitally controllable current source 464 may comprise a multibit current DAC or a current controlled buck. The resolution, or minimum current step, may be determined by one LSB of the digital control signal 466. The digital control signal may comprise between 2 and 16 bits and thus include between 4 and 65536 discrete steps which leads to a corresponding number of discrete steps of the secondary DC output current Icon. The digitally controllable current source is connected between the positive output terminal 162 and the negative output terminal 464 and therefore connected in parallel with the converter load, LOAD which may comprise one or more LEDs. The digitally controllable current source 464 is configured to subtract the secondary DC output current (Icon) from the primary DC output current (Io) supplied by the output of the switched converter core 105 and thereby decrease the load current (Iload) in well-controlled steps. When the switched converter core 105 delivers its minimum DC output current, as set by the minimum resolution of the primary control signal, the digitally controllable current source 464 can be activated via the digital control signal 466 operating as a secondary control signal of the converter 450. The secondary DC output current (Icon) is sunk or subtracted from the minimum DC output current and therefore increases the resolution of the latter by the step size of the secondary DC output current Icon.

Figure 6:
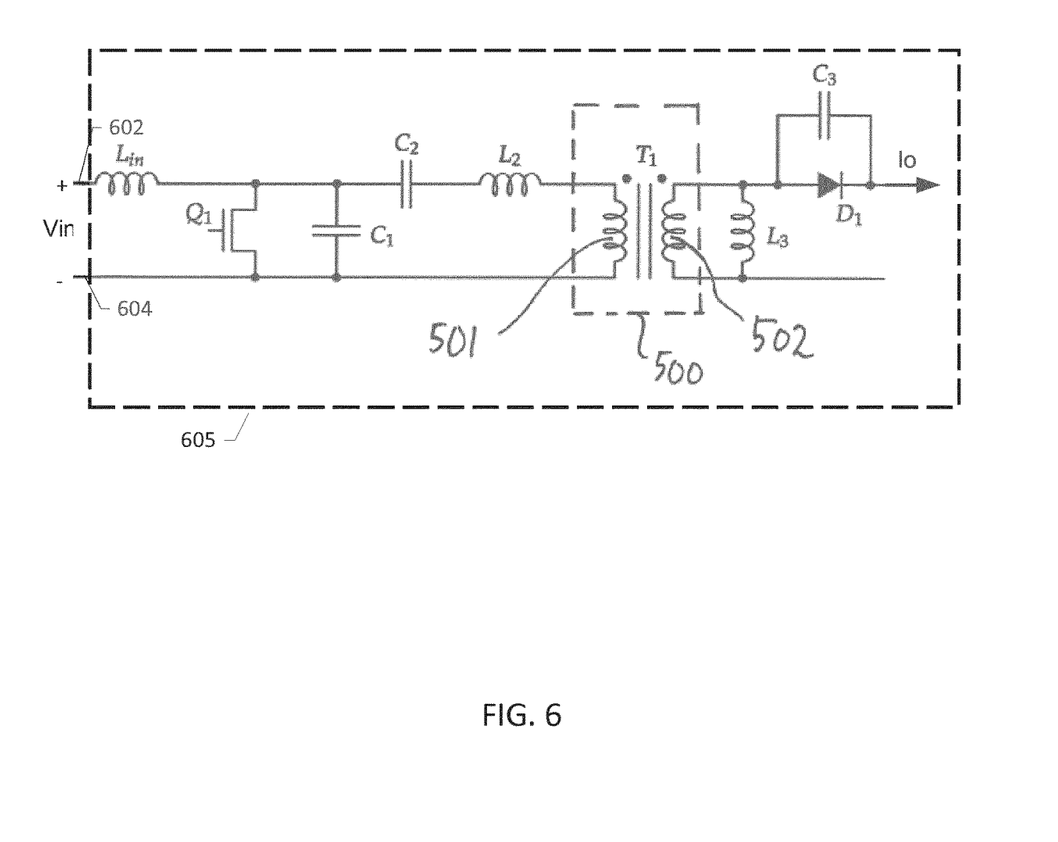
FIG. 6 shows a transistor level diagram of an exemplary switched converter core based on a class E converter.

FIG. 6 shows a transistor level diagram of an exemplary galvanically isolated switched converter core 605 based on a class E converter. The switched converter core 605 receives a DC-input voltage Vin on a primary side or input circuit, arranged to the left of isolating transformer T1. The switched converter core 605 generates a DC output voltage and a DC output current Io—for example to a load via the secondary side circuit. The primary side circuit comprises a semiconductor switch arrangement $Q_1$, such as a MOSFET, with a control terminal that may be controlled by or driven by the previously discussed primary control signal. The switched converter core 605 comprises a resonant tank or network formed by capacitance C2 and the secondary side circuit comprises a rectification circuit for example a class-E rectifier, here represented schematically by diode D1, capacitance C3, and inductance L3. The primary side and secondary side circuits are coupled by an isolating transformer T1. The isolation transformer T1 may comprise a PCB embedded solenoid transformer 500 with a primary winding 501 and a secondary winding 502 inductively coupled to the primary winding 501, wherein the coupling designated by the double vertical line may be a coreless coupling.

The invention claimed is:

1. A DC-DC power converter comprising:
   a primary side circuit comprising a positive input terminal and a negative input terminal for receipt of a DC input voltage,
   a secondary side circuit comprising a positive output terminal and a negative output terminal for supply of a load current to a load,
   a switched converter core operated in accordance with a primary control signal to supply a primary DC output current (Io) of the converter, said primary control signal exhibiting a minimum resolution leading to a corresponding minimum current step of the primary DC output current, and
   a controllable resistive path or a controllable current source, wherein the controllable resistive path or the controllable current source is connected between a pair of terminals selected from the group of: the positive output terminal, the negative output terminal, the positive input terminal, and the negative input terminal, and wherein the controllable resistive path or the controllable current source is configured to add or subtract a secondary DC output current (Icon) to the primary DC output current (Io) in accordance with a secondary control signal to adjust the load current (Iload),
   wherein a minimum current step of the secondary DC output current (Icon) is between 4 and 65536 times smaller than the minimum current step of the primary DC output current (Io).

2. The DC-DC power converter according to claim 1, wherein the secondary control signal is configured to adjust at least one of:
   a resistance of the controllable resistive path to control the secondary DC output current, and
   a current level or magnitude of the controllable current source to directly adjust the secondary DC output current.

3. The DC-DC power converter according to claim 2, wherein the DC-DC power converter comprises the controllable resistive path, and wherein the secondary DC output current is adjustable between a minimum value and a maximum value by adjusting the resistance of the controllable resistive path.

4. The DC-DC power converter according to claim 3, wherein the minimum step of the primary DC output current is substantially equal to the maximum value of the secondary DC output current.

5. The DC-DC power converter according to claim 1, wherein the DC-DC power converter comprises the controllable resistive path, wherein the controllable resistive path comprises a transistor, and wherein a control terminal of said transistor is connected to the secondary control signal.

6. The DC-DC power converter according to claim 5, wherein the secondary control signal comprises:
   a DC voltage, or
   a modulated control voltage.

7. The DC-DC power converter according to claim 6, wherein the modulated voltage comprises a PWM modulated voltage, a PDM modulated voltage, or a duty-cycle/burst-mode modulated voltage.

8. The DC-DC power converter according to claim 7, wherein the modulated control voltage is derived from a multibit control signal for controlling a modulation of the PWM modulated voltage or the PDM modulated voltage.

9. The DC-DC power converter according to claim 5, wherein the transistor comprises a MOSFET operating in its linear region or operating in triode-mode.

10. The DC-DC power converter according to claim 1, wherein the primary control signal comprises a modulated switch control signal.

11. The DC-DC power converter according to claim 10, wherein the modulated switch control signal comprises a PWM modulated control voltage, a PDM modulated control voltage, a PAM modulated control voltage, or a duty-cycle/burst-mode modulated control voltage.

12. The DC-DC power converter according to claim 1, wherein the switched converter core comprises a semiconductor switch arrangement having a control input connected to the primary control signal and an output coupled to an inductive network.

13. The DC-DC power converter according to claim 1, wherein the DC-DC power converter comprises the controllable resistive path, and wherein the controllable resistive path is connected between the positive output terminal and negative output terminal to subtract the secondary DC output current from the primary DC output current and thereby decrease the load current.

14. The DC-DC power converter according to claim 1, wherein the DC-DC power converter comprises the controllable resistive path,
   wherein the switched converter core is configured to step-down the DC input voltage, and
   wherein said controllable resistive path is connected between the positive input terminal and the positive output terminal to add the secondary DC output current to the primary DC output current and thereby increase the load current.

15. The DC-DC power converter according to claim 1, wherein the DC-DC power converter comprises the controllable resistive path,
   wherein the switched converter core comprises:
      a galvanic isolation barrier coupling the primary side circuit to secondary side circuit, and
      an electrical connection between the positive input terminal and the negative output terminal to arrange the input and output of the switched converter core in series across the DC input voltage, and
   wherein said controllable resistive path is connected between the positive output terminal and the negative input terminal to add the secondary DC output current to the primary DC output current and thereby increase the load current.

16. The DC-DC power converter according to claim 1, wherein the switched converter core comprises a resonant class DE converter, a resonant class E converter, or a resonant SEPIC converter.

17. The DC-DC power converter according to claim 1, wherein the minimum resolution comprises a minimum time step.

18. The DC-DC power converter according to claim 1, wherein the secondary control signal is a digital control signal comprising a number of bits, wherein the minimum current step of the secondary DC output current (Icon) is determined by one LSB of the digital control signal.

19. The DC-DC power converter according to claim 1, wherein the switched converter core is configured to be interrupted or powered-down such that the primary DC output current (Io) is zero, wherein when the primary DC output current (Io) is zero the load current (Iload) is determined solely by the secondary DC output current (Icon).

* * * * *